United States Patent [19]

Mino

[11] 4,428,004
[45] Jan. 24, 1984

[54] MAGNETIC TAPE SYSTEM FOR OPTIMALLY REPRODUCING STILL AND SLOW MOTION VIDEO PICTURES

[75] Inventor: Mineo Mino, Hirakata, Japan

[73] Assignee: Matsushita Electric Industrial Co., Ltd., Osaka, Japan

[21] Appl. No.: 260,721

[22] Filed: May 5, 1981

[30] Foreign Application Priority Data

May 9, 1980 [JP] Japan .................... 55-62073

[51] Int. Cl.³ ............................... H04N 5/783
[52] U.S. Cl. .......................... 360/10.2; 360/10.3
[58] Field of Search .................... 360/10.1–10.3, 360/14.1–14.2, 33.1, 37.1, 38.1, 70, 71, 72.1–72.3, 73, 74.1, 74.4

[56] References Cited

U.S. PATENT DOCUMENTS

| | | | |
|---|---|---|---|
| 3,557,320 | 1/1971 | Hopf | 360/10.2 |
| 3,789,138 | 1/1974 | Terada | 360/10.3 |
| 3,943,562 | 3/1976 | Opelt | 360/10.3 |
| 3,968,518 | 7/1976 | Kihara et al. | 360/14.2 |
| 4,190,869 | 2/1980 | Ota | 360/10.2 |
| 4,276,571 | 6/1981 | Sakamoto | 360/10.2 |
| 4,280,146 | 7/1981 | Misaki et al. | 360/10.2 |
| 4,306,255 | 12/1981 | Misaki et al. | 360/10.3 |

FOREIGN PATENT DOCUMENTS

| | | | |
|---|---|---|---|
| 52-42320 | 4/1977 | Japan | 360/10.2 |
| 55-68777 | 5/1980 | Japan | 360/10.3 |
| 55-150683 | 11/1980 | Japan | 360/10.3 |
| 56-32886 | 4/1981 | Japan | 360/10.2 |

OTHER PUBLICATIONS

Azuma et al., Microprocessor Controlled Variable Play-Back Speed System for Video Tape Recorder, IEEE Trans. Consum. Electron., vol. CE-26, 2/80, pp. 121–128.

*Primary Examiner*—Raymond F. Cardillo, Jr.
*Attorney, Agent, or Firm*—Wenderoth, Lind & Ponack

[57] ABSTRACT

A VTR reproducing system in a slant track type video tape recorder, in which a tape transport motor is driven by two pulse signals formed of a reference signal and different in frequency but coincident in phase, thereby reproducing a noiseless still picture and a slow motion picture on the television receiver.

4 Claims, 17 Drawing Figures

MAGNETIC TAPE SYSTEM FOR OPTIMALLY REPRODUCING STILL AND SLOW MOTION VIDEO PICTURES

FIELD OF THE INVENTION

This invention relates to a magnetic tape reproducing system suitable for reproducing a still and a slow motion picture at a helical scanning VTR or slant track VTR, and more particularly to a tape transport motor rotation control system capable of reproducing a slow motion picture simultaneously with producing a still picture of no noise bars on a television receiver.

BACKGROUND OF THE PRIOR ART

A method to reproduce by rotary magnetic heads a magnetic tape of slant-recorded video tracks to thereby obtain a still picture, has been proposed by the U.S. Pat. No. 3,943,562. The patent relates to positional control of a tape, i.e., control of a tape transport motor, for reproducing a still picture. The present invention, which employs video heads of mutually different azimuth angles and a recording tape of the so-called guardband-less type, is different from the above Patent in a form of an envelope of reproduced signal by the video heads, whereby the motor control system also differs from the Patent. The motor control system has been proposed by the U.S. Pat. Nos. 3,789,138 and 3,968,518, both the patents relating to a method by which the tape is brought to a halt at a required position. While, the present invention produces from the reference signal two kinds of signals for driving the tape transport motor during reproducing a still and a slow motion picture, the two signals being properly combined to obtain a smooth slow-motion reproduction and a noiseless signal on the television picture. Therefore, both the above patents differ from the present invention.

SUMMARY OF THE INVENTION

An object of the invention is to provide a magnetic tape reproducing system optimum and novel to reproduce a still and a slow motion picture at a helical-scanning type VTR.

Another object of the invention is to provide a novel and improved control system for a new tape transport motor.

These objects can be accomplished by the following means: A detecting means for detecting a rotary phase of the video head to generate a rotary phase pulse signal, a first pulse generating means for detecting a level-down portion of reproducing signal at the video head to generate a first pulse signal representing the level-down portion, a second pulse generating means for dividing into 1/2n the rotary phase pulse obtained by the detecting means to obtain a second pulse signal of a pulse width $T_2$, and a third pulse generating means for dividing into 1/n the rotary phase signal to obtain a third pulse signal of a pulse width $T_1$, are provided, so that the second pulse signal is amplified to be given to a tape transport motor, thereby running the magnetic tape at low speed. At a moment of allowing the rotary phase pulse to coincide with the phase of first pulse signal, the second pulse signal is stopped from being given to the tape transport motor to thereby reproduce the still picture, and the second and third pulse signals are mixed and amplified to be given to the tape transport motor to thereby reproduce a slow motion picture.

These and other objects of the invention will become more apparent in the detailed description and examples which follow.

DETAILED DESCRIPTION OF THE PREFERRED EMBODIMENT

Figure 1:
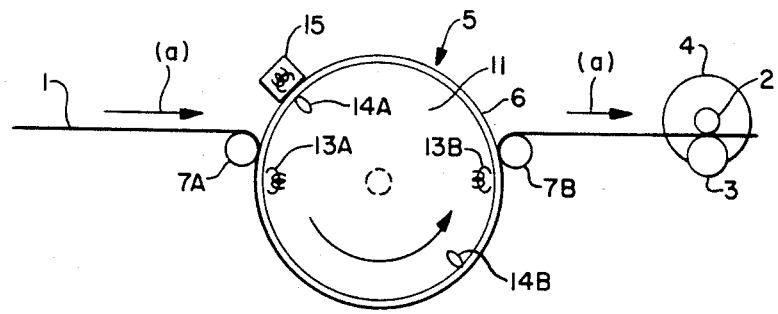
FIG. 1 is a plan view of an embodiment of a magnetic reproducing system of the invention, showing a tape travelling unit and a rotary head drum unit.
Figure 2:
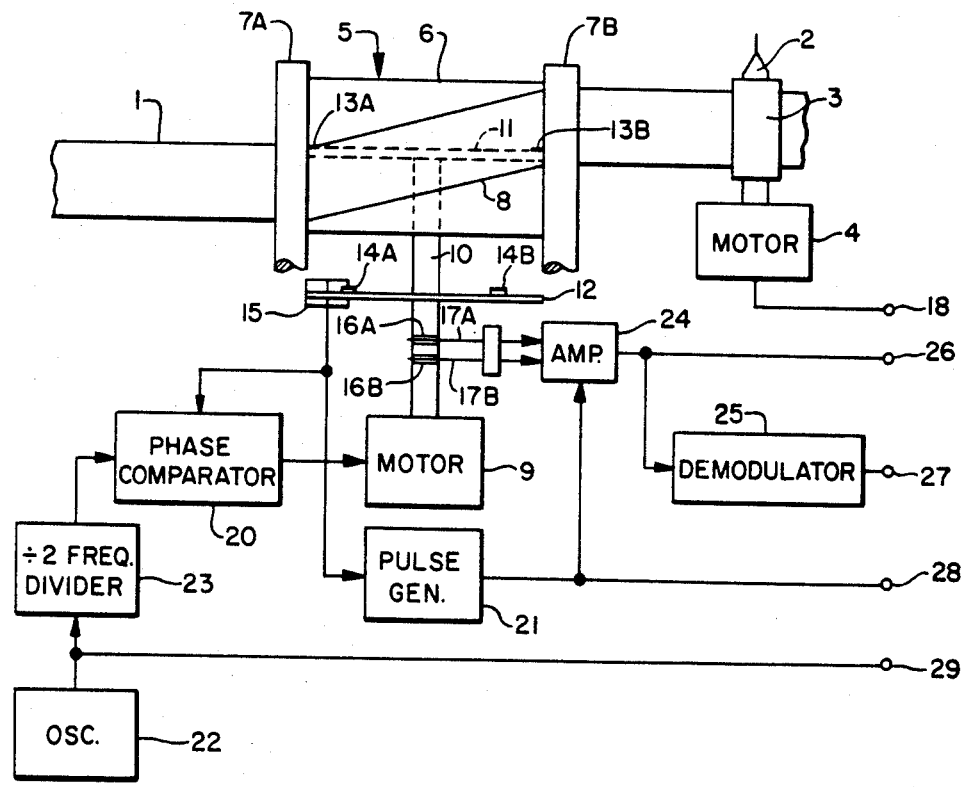
FIG. 2 is a front view of the tape travelling and rotary head drum units, including a circuit diagram relating thereto.

Referring to FIGS. 1 and 2, a magnetic tape 1 is moved in the arrow (a) direction by a capstan 2 and pinch roller 3, the capstan 2 of the invention being driven directly by a tape transport motor 4. The magnetic tape system has on the way thereof a rotary magnetic head drum unit 5. Magnetic tape 1 is wound onto the outer periphery of a drum 6 at an angle of 180° or more by guide poles 7A, 7B and running obliquely along a lead 8 at the outer periphery of drum 6. Also, rotary magnetic head drum unit 5 has a rotary drum 11 and a disc 12 connected directly to a shaft 10 of drum motor 9. On rotary drum 11 are provided rotary magnetic heads 13A, 13B (to be hereinafter called the video heads) which scan video tracks 50A, 50B of magnetic tape 1 in FIG. 4 to reproduce signals. Every time magnets 14A, 14B on disc 12 revolve over a gap of a stationary magnetic head 15, a pulse signal is given therefrom. Magnets 14A, 14B, when facing magnetic head 15 at N and S poles of magnets 14A, 14B respectively, can output signals of heteropolarity. A phase comparator 20 and a pulse generator 21 are given signal from magnetic head 15, the phase comparator 20 also being given a signal of the reference oscillator 22 frequency-divided into 1/2 by means of a 1/2 frequency divider, thereby outputting a phase error signal between both the signals. The phase error signal is given to drum motor 9 to control the rotary phase, thereby rotating drum motor 9 synchronously through a phase difference α (see FIG. 5) in the reference signal. When pulse generator 21 is given signal from magnetic head 15, a square wave signal is given out which indicates a period of video head 13A or 13B's scanning or magnetic tape 1 (see FIG. 5-d).

On the other hand, signals reproduced by video heads 13A, 13B are given to an amplifier 24 through, for example, slip rings 16A, 16B, and brushes 17A, 17B. The amplifier 24 also is given the square wave signal from pulse generator 21 to eliminate an overlap (caused by magnetic tape 1 wound at an angle of 180° or more on the periphery of drum 6) of signals from video heads 13A, 13B. An output of amplifier 24 is given to a demodulator 25 and taken out as a compound video signal from a terminal 27.

Figure 4:
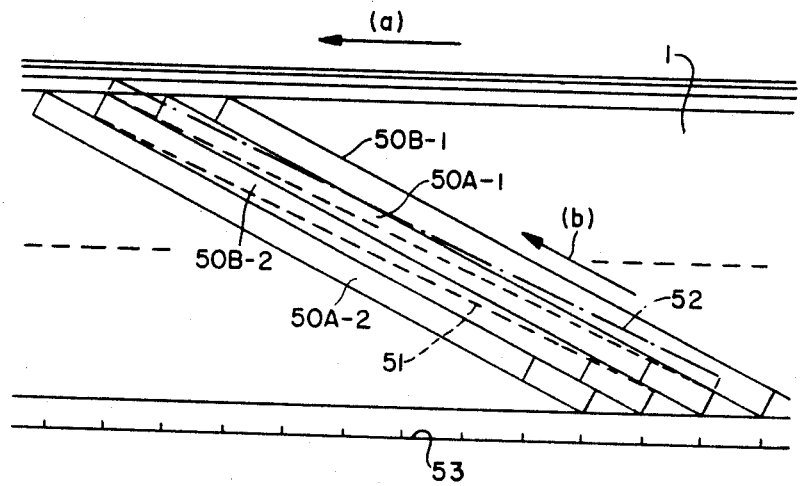
FIG. 4 illustrates a track pattern on a magnetic tape and the paths of rotary heads, and FIG. 5, consisting of a–m, shows wave forms of respective units in the FIGS. 2 and 3 circuit diagrams.

VTR can reproduce a usual signal in such a manner that a control signal 53 shown in FIG. 4 is reproduced and a phase error signal between said signal and the 1/2 divided signal of reference signal at 1/2 frequency divider, controls tape transport motor 4 so that video heads 13A, 13B are on-track to video tracks 50A, 50B to output continuous video signals.

Figure 3:
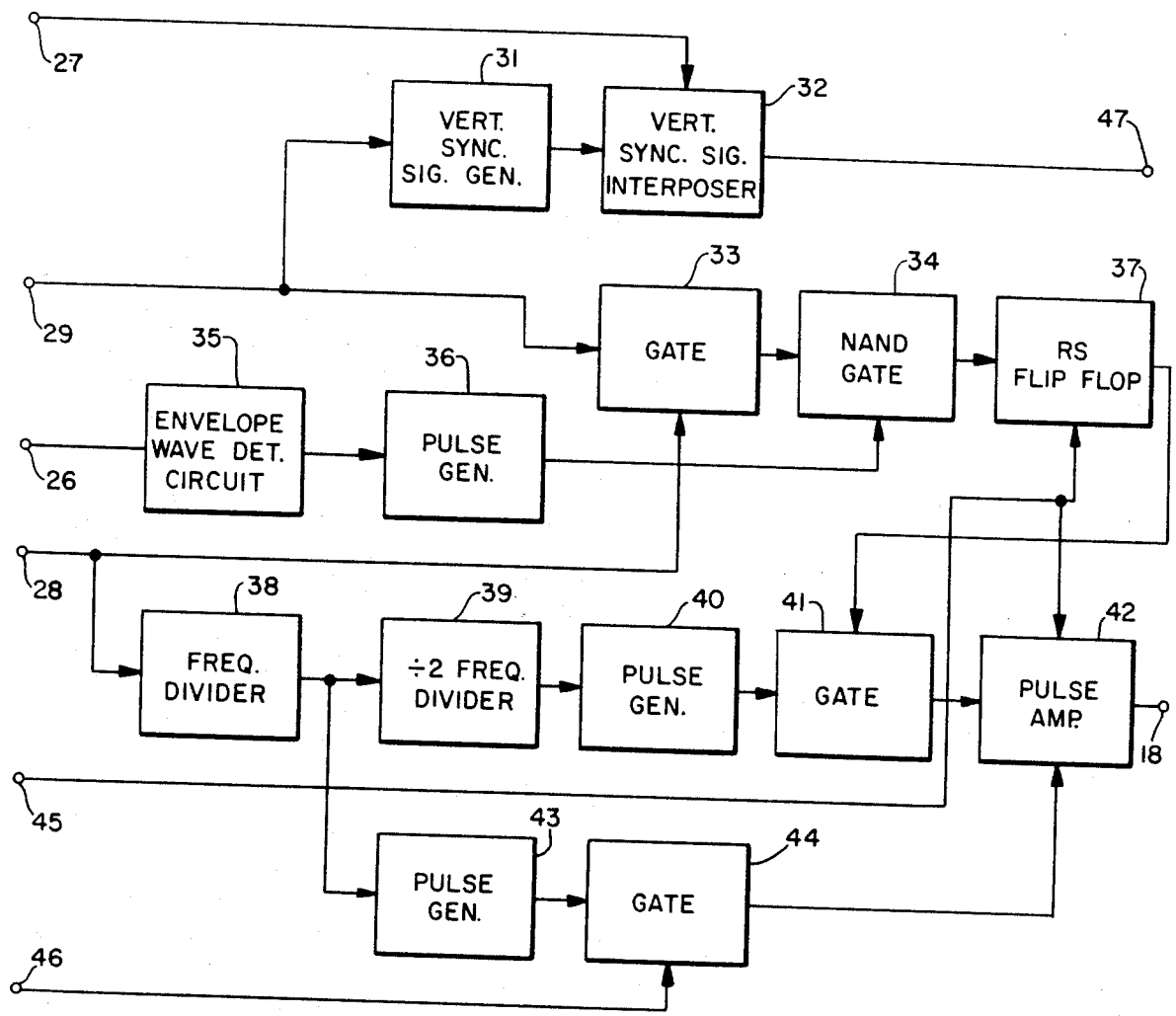
FIG. 3 is a circuit diagram of a tape transport motor control circuit and a signal processing circuit of the invention when a still and a slow motion picture is reproduced.
Figure 5:
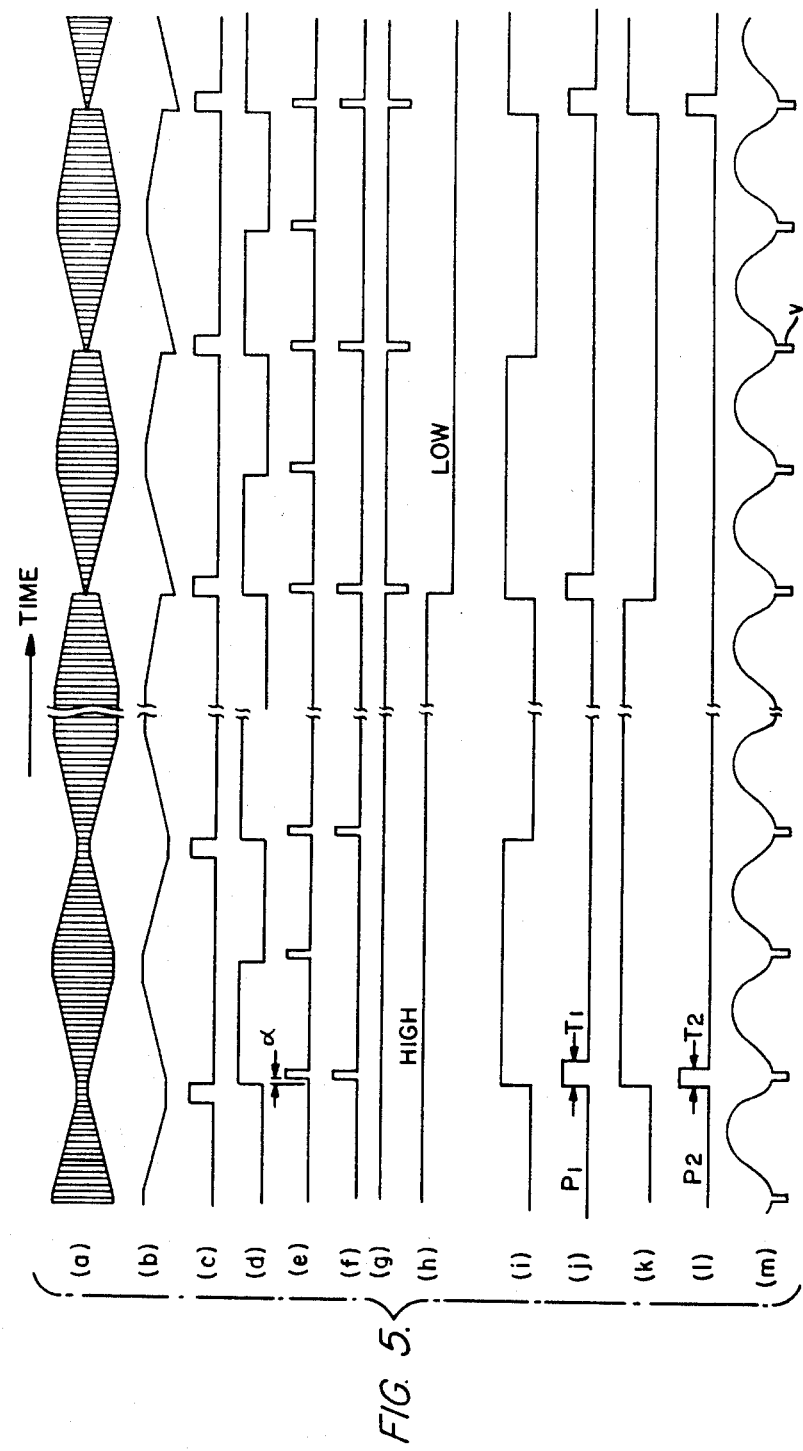

Next, the still and slow motion picture reproducing method will be detailed in accordance with FIGS. 3 to 5. This invention, when reproducing a still picture, restrains the level-down portion of reproduced signal from appearing on the television receiver picture as the abovementioned. At first, this point will be described based on a record pattern in FIG. 4, in which the video tracks 50A, 50B are recorded by video heads different in azimuth angles of the head gap, according to the so-called the guard-bandless-azimuth recording system. Respective tracks 50A, 50B are reproduced by video heads 13A, 13B coincident in the azimuth angle with each other, where video head 13A reproduces the recorded signal on track 50A and video head 13B reproduces that of track 50B, in the direction of the arrow (b). It is enough for obtaining the still picture to stop magnetic tape 1 from travelling and reproduce tracks 50A, 50B by video heads 13A, 13B, at which time video heads 13A, 13B scan magnetic tape 1 as shown by the dotted line in FIG. 4, whereby the reproducing outputs from video heads 13A, 13B, for example, become those as shown in FIG. 5-(a). The signal wave form differs in its reproduced signal wave form when video heads 13A, 13B scan at different positions respectively. Wave forms at the right-half in FIG. 5 are generated in a case of scanning as shown by the dotted line in FIG. 4, which are identical to signal wave forms when a head width of respective video heads 13A, 13B is made about one-half times a width of recording track, an actually scanning range for reproduction being bounded by the dotted line 51 and one-dot-and-dash line 52. The still picture of the invention means a picture reproduced when the magnetic tape is brought to a halt at the above position. The position is hereinafter called the optimum still picture reproducing position and a method to stop the magnetic tape at the above position will be detailed as follows.

Usually, when the still picture is intended to be viewed, the tape is temporarily stopped at a desired moment while reproducing the magnetic tape, in which the tape stops almost in not-coincidence with the optimum still picture reproducing position although it may be coincident therewith. The magnetic tape, when not in coincidence with the optimum position, should be travelled to the nearest position of reproducing the optimum still picture. Control of tape transport motor 4 for this purpose will be described in accordance with the FIG. 3 circuit diagram and FIG. 5 wave forms. In addition, the wave forms at the left-half of FIG. 5 are out of the optimum still picture reproducing position, and show each condition of reproducing a position somewhat leftward from the dotted line 51 in FIG. 4.

In FIG. 3, input terminals 26, 27, 28 and 29 are identical with output terminals 26, 27, 28 and 29 in FIG. 2, the signal described in FIG. 2 being given to the respective input terminals. Terminal 29 is given a signal from reference oscillator 22, shown by FIG. 5-(e), frequency of which signal is the field frequency of 59.95 Hz rated by the Japenese and U.S. standard television system. The above pulse signal from terminal 29 is given to a vertical synchronization signal generator 31 and gate circuit 33, the generator 31 serving to wave-shape the pulse signal (FIG. 5-(e)) and generate the same signal as a vertical synchronization signal V of the video signal shown in FIG. 5-(m). The generated vertical synchronization signal is given to a vertical synchronization signal interposer 32 in which the vertical synchronization signal of reproduced video signal given to terminal 27 is displaced by the vertical synchronization signal from vertical synchronization signal generator 31. The reason for displacement will be hereinafter described. The reference signal from terminal 29 is given to gate circuit 33, which is given a square wave signal shown in FIG. 5-(d) from terminal 28, the square wave signal being obtained from pulse generator 21 in FIG. 2. Gate circuit 33 outputs a pulse signal shown by FIG. 5-(f), the pulse signal being given further to NAND gate circuit 34.

On the other hand, reproduced signals (output of amplifier 24 in FIG. 2) of video heads 13A, 13B are given to terminal 26 and pass through an envelope wave-detection circuit 35 so as to be a signal shown in FIG. 5-(b). The detection signal is given to pulse generator 36 and detects thereat the level-down portion (non-signal portion) of detection signal to produce a pulse signal shown by FIG. 5-(c), the pulse signal being given to NAND gate circuit 34. NAND gate circuit 34 is given signal shown in FIG. 5-(f), so that when both the signals coincide in phase, a pulse signal shown in FIG. 5-(g) is achieved and given to a RS flip-flop (to be hereinafter described RS.FF) 37, the RS.FF 37 being given a tape transport motor stop command signal applied to terminal 45. A user pushes a temporary stop button (not shown) when he intends to see the still picture, at which time the stop command signal stepwise changes in level. For example, assuming that the signal is at the earth level (low level) prior to a push of the temporary stop button, at the moment of pushing the button it stepwise proceeds to a certain level (high level). If a set input and reset input of RS.FF 37 are assumed to be able to set and reset RS.FF 37 respectively when the input signal is of the low level, upon applying a signal from the temporary stop button to the set input (S input), the output of RS.FF 37 becomes a high level as shown in FIG. 5-(h). Upon applying an output signal of NAND gate circuit 34 in FIG. 5-(g) to the reset input (R input) of RS.FF 37, the output of RS.FF 37 changes to a low level as shown in FIG. 5-(h).

While, the square wave signal (FIG. 5-(d)) given to terminal 28 passes through 1/2 frequency divider 38 so as to become a square wave signal shown in FIG. 5-(i), and then is given to 1/2 frequency divider 39 and pulse generator 43. An output of 1/2 frequency divider 39 becomes a signal shown by FIG. 5-(k), which is divided into 1/2 from the signal in FIG. 5-(i). An output of 1/2 frequency divider 39 is given further to pulse generator 40, thereby obtaining thereat a pulse signal P1 of pulse width $T_2$ as shown in FIG. 5-(l). Next, pulse signal P1 is given to gate circuit 41, to which the signal of RS.FF 37 shown in FIG. 5-(h) is given, so that an output of gate circuit 41, at a high level portion of signal shown in FIG. 5-(h), is given as the pulse signal in FIG. 5-(l) to the next pulse amplifier 42, but is restrained at a low level portion. The pulse signal amplified by pulse amplifier 42 is given through terminal 18 to tape transport motor 4 shown in FIG. 2, thereby rotating tape transport motor 4 at low speed. When FIG. 5-(c) pulse signal coincides in phase with FIG. 5-(f) pulse signal, that is, when scan paths of video heads 13A, 13B are positioned within between the dotted line 51 and the one-dot-and-dash line 52, the pulse signal (FIG. 5-(l)) given to tape transport motor 4 is restrained to stop the motor 4, thereby obtaining the still picture. In addition, pulse amplifier 42 is given the tape transport motor stop command signal given to terminal 45, so that the user pushes the temporary stop button when he intends to see the still picture, at which time pulse amplifier 42 operates. Hence, upon pushing the temporary stop button, pulse signal P1 (FIG. 5-(*l*)) firstly is given to tape transport motor 4, so that when the scan paths of video heads 13A, 13B reach the aforesaid positions shown in FIG. 4, the pulse signal is restrained and tape transport motor 4 stops, whereby the still picture is obtainable.

Next, a method to reproduce a slow motion picture from the above condition will be detailed. It is enough for reproduction of slow motion picture to drive tape transport motor 4 continuously at low speed. Therefore, pulse generator 43 at first is given the square wave signal from 1/2 frequency divider 38 shown in FIG. 5-(*i*), thereby obtaining pulse signal P2 of pulse width $T_1$ shown in FIG. 5-(*j*), and then pulse signal P2 is given to pulse amplifier 42 through gate circuit 44. Hence, tape transport motor 4 is rotated at low speed to get the slow motion picture reproduction. The gate circuit 44 is adapted to open in gate only during the slow motion reproducing. Gate circuit 44 also is given a signal of high level (gate open in the high level) from terminal 46 while the user is pushing a slow motion reproducing button (not shown), and is given a signal of low level in condition other than the above. The pulse signal P1 (FIG. 5-(*l*)) for the still picture and that P2 (FIG. 5-(*j*)) for the slow motion reproduction, as seen from FIG. 5, have a relation between the frequency $f_{p1}$ of pulse signal P1 and that of $f_{p2}$ of pulse signal P2, as $$f_{p2} = 2f_{p1} \qquad (1)$$

and are coincident in phase with each other. It is desirous that a relation between the pulse widths $T_1$ and $T_2$ is $$T_1 \geqq T_2 \qquad (2).$$

The relations of formulas (1) and (2) are necessary for the following reason. The embodiment of the invention uses the pulse signals of half-frequency-divided rotary phase pulses of video heads 13A, 13B for performing the slow motion reproduction, in which the frequency dividing ratio changing due to the kind of capstan 4 for use and also to a set slow motion ratio. In other words, when the slow motion ratio is set, it is necessary to select a frequency dividing ratio 1/n and pulse width $T_1$, by which the tape transport motor 4 rotates most smoothly in the vicinity of the slow motion ratio. The embodiment, which sets a slow motion ratio of 1/10, may, as abovementioned, be required to change the frequency dividing ratio due to the kind of tape transport motor 4. In order to obtain the still picture, there is no need of continuously feeding the magnetic tape as foregoing, but the magnetic tape is enough to moderately travel and stop at the position as shown in FIG. 4. The relation of formula (1) herewith is selected to feed the tape rather at low speed (slower than the slow motion) and stop it at the predetermined position, which relation may alternatively be $f_{p2} = 4f_{p1}$ if coincident in phase. However, the relation of formula (1) is preferable because an impression for the still picture is poor when a transition of the picture becomes too different. Also, a change of pulse width $T_1$ enables a little change in the slow motion ratio. In other words, the larger the pulse width $T_1$ is, the faster the tape transport motor 4 rotates due to more energy given thereto, but a sharp increase of pulse width leads to a poor picture due to not-smooth rotation of tape transport motor 4. During the slow motion reproduction, pulse signals P1 and P2 are given to tape transport motor 4, so that pulse widths applied thereto differ alternately if without the relation of formula (2), resulting in not-smooth rotation of tape transport motor 4 and the problem created in the abovementioned picture. Pulse amplifier 42, even applied with both the pulse signals, is required to keep constant its output width.

The FIG. 5-(*f*) signal, which is derived from gate circuit 33, may alternatively be formed from the FIG. 5-(*d*) rotary phase signal because the rotary phase signal (FIG. 5-(*d*)) of video head and reference signal (FIG. 5-(*e*)), as seen from FIG. 5, have a relation of mutual synchronization in a phase difference α.

In a case that the vertical synchronization signal is replaced by the reference signal during the reproducing the still and slow motion pictures, when the vertical synchronization signal is positioned just at a non-signal part (a) in the video head reproducing signal shown in FIG. 5-(*a*), an omit of vertical synchronization signal is formed to disturb the vertical synchronization of television receiver, resulting in a poor picture. Hence, the aforesaid vertical synchronization signal interposer 32 interposes into the reproduced video signals the vertical synchronization signal derived from the reference signal, thereby eliminating the above defect.

Furthermore, if the slow motion ratio is selected to be large to an extent that only one still picture is fed when the slow motion reproducing button is pushed for a little while, it is possible to reproduce the picture in series frame separation. Therefore, the slow motion ratio of 1/10 in the embodiment is adopted in consideration of the reproduction by series frame separation.

As seen from the above, this invention can most effectively control the tape transport motor for reproducing the still and slow motion pictures, generates no noise on the television picture during the still picture reproducing, and the slow motion reproduction can smoothly be displaced by the still picture reproduction to enable reproduction by series frame separation by use of a simple circuit, thereby being of an extremely larger industrial value.

While an embodiment of the invention has been shown and described, the invention is not limited to the specific construction thereof, which is merely exemplary in the specification rather than defined.

What is claimed is:

1. In a helical scanning VTR having a tape transport motor and rotating video reproducing heads, a control device comprising: a rotary phase detecting and generating means for detecting a rotary phase of said video heads and for generating a rotary phase pulse signal in response to said detached rotary phase; a first pulse detecting and generating means for detecting a low level portion of a reproduced signal from each of said video heads and for generating a first pulse signal which is indicative of the detection of said low level portion; a second pulse generating means connected to said rotary phase detecting means for frequency dividing said rotary phase pulse signal obtained from said detecting means by a factor of 1/2n so as to generate a second pulse signal having a pulse width of $T_2$; and a third pulse generating means connected to said rotary phase detecting means for frequency dividing said rotary phase pulse signal by a factor of 1/n so as to generate a third pulse signal having a pulse width of $T_1$; wherein said second pulse signal is fed to an amplifier where it is amplified and then fed to said tape transport motor; said device further comprising a phase comparator which is connected to said rotary phase detecting means and said first pulse generating means so that when the phase of said rotary phase pulse with the phase of said first pulse signal, an inhibit signal is fed to a gate means connected between said amplifier and said tape transport motor so as to inhibit said second pulse signal from being fed to said tape transport motor so as to thereby enable the reproduction of a still video picture, and further comprising a mixing and amplifying means for mixing and amplifying said second and third pulse signals and for supplying said mixed and amplified signals to said tape transport motor so as to thereby enable the reproduction of a slow motion video picture.

2. A control device according to claim 1, wherein said second and third pulse generating means are arranged such that said second pulse signal coincides in phase with said third pulse signal and pulse width $T_2$ is less than or equal to pulse width $T_1$.

3. A control device according to claim 2, wherein said third pulse generating means is arranged such that said third pulse width $T_1$ is varied so as to obtain a desired slow motion speed ratio.

4. A control device according to claim 1, wherein said second and third pulse generating means are arranged such that n is equal to 2.

* * * * *